United States Patent
Popescu et al.

(10) Patent No.: US 7,796,405 B2
(45) Date of Patent: Sep. 14, 2010

(54) PHASE SHIFTED DC-DC CONVERTER WITH IMPROVED EFFICIENCY AT LIGHT LOAD

(75) Inventors: Lucian Popescu, Austin, TX (US);
Padmanabh Gharpure, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 148 days.

(21) Appl. No.: 12/098,783

(22) Filed: Apr. 7, 2008

(65) Prior Publication Data

US 2009/0251927 A1 Oct. 8, 2009

(51) Int. Cl.
*H02M 3/335* (2006.01)
*H02M 7/5387* (2006.01)
*H02M 7/44* (2006.01)

(52) U.S. Cl. .......................... 363/17; 363/97; 363/132

(58) Field of Classification Search .................. 363/15, 363/17, 56.02, 58, 97, 98, 131, 132, 136, 363/16; 323/234, 235, 351, 284, 247, 319
See application file for complete search history.

(56) References Cited

U.S. PATENT DOCUMENTS

| | | | |
|---|---|---|---|
| 5,546,294 A | | 8/1996 | Schutten et al. |
| 6,272,023 B1 * | | 8/2001 | Wittenbreder ................ 363/16 |
| 6,310,785 B1 * | | 10/2001 | Ayyanar et al. ............... 363/17 |
| 6,611,444 B2 * | | 8/2003 | Ayyanar et al. ............. 363/132 |
| 2002/0054498 A1 * | | 5/2002 | Cho et al. .................... 363/132 |
| 2007/0025125 A1 * | | 2/2007 | Nakahori et al. ......... 363/56.02 |
| 2009/0225569 A1 * | | 9/2009 | Begalke ....................... 363/17 |

OTHER PUBLICATIONS

"New Phase Shift Modulated ZVS Full-Bridge DC/DC Converter with Minimized Auxiliary Current for Medium Power Fuel Cell Application," Mason et al., IEEE, Power Electronics Applied Research Lab, Dept. of Electrical & Computer Engineering, Queen's University, Kingston, Ontario, 0-7803-9033-4, pp. 244-249, 2005.

* cited by examiner

*Primary Examiner*—Adolf Berhane
*Assistant Examiner*—Emily Pham
(74) *Attorney, Agent, or Firm*—Larson Newman & Abel, LLP

(57) ABSTRACT

A device including a full bridge, a half bridge, a first inductor, and a second inductor. The full bridge has a first pair of transistors being activated when a load applied to the device is above a predetermined level and deactivated when the load applied to the device is below the predetermined level, and a second pair of transistors being continuously activated. The half bridge has a third pair of transistors that are activated when the load applied to the device is below the predetermined level and deactivated when the load applied to the device is above the predetermined level. The first and second inductors are connected between the outputs of the full and half bridges are adapted to cooperate with each other to provide a zero voltage switching of the device at a light load. The first and third pairs of transistors are activated at different times.

19 Claims, 5 Drawing Sheets

PHASE SHIFTED DC-DC CONVERTER WITH IMPROVED EFFICIENCY AT LIGHT LOAD

FIELD OF THE DISCLOSURE

This disclosure generally relates to information handling systems, and more particularly relates to a DC-DC converter with an improved efficiency at light loads.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Typically, computer systems rely on switch mode power supplies to assure the hardware interface between the available power sources, such as an alternating current (AC), and the information handling system components.

Soft-switching quasi-resonant phase shifting full-bridge is a well known topology that is used frequently in direct current to direct current (DC-DC) power conversion solutions due to its ability to achieve zero voltage switching (ZVS) for the main power transistor switches. Increasing efficiency at full power by eliminating switching losses and improving the electromagnetic interference (EMI) power supply radiation are just two of the important benefits claimed by achieving ZVS in the power conversion switching process.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
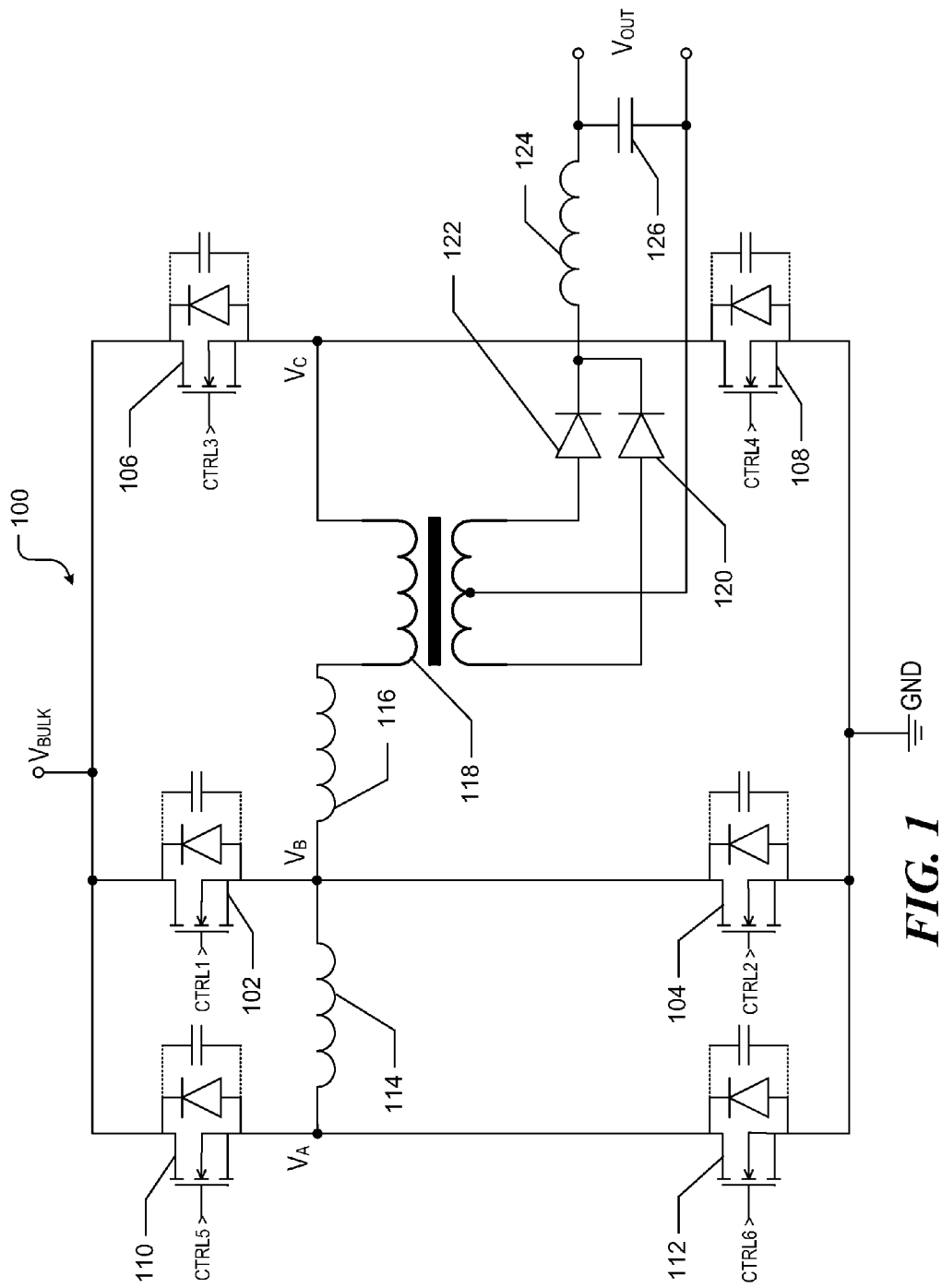
FIG. 1 is a schematic diagram of a direct current to direct current (DC-DC) converter circuit.

FIG. 1 shows a direct current to direct current (DC-DC) converter 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The DC-DC converter 100 includes transistors 102, 104, 106, 108, 110, and 112, inductors 114 and 116, and transformer 118. The transistors 102, 104, 106, 108, 110, and 112 have internal body diodes and parasitic capacitor as shown in FIG. 1. The transistor 102 has a first current electrode connected to a first voltage reference, labeled $V_{BULK}$, a second current electrode, and a control electrode connected to a control signal, CTRL1. The transistor 104 has a first current electrode connected to the second current electrode of the transistor 102, a second current electrode connected to a second voltage reference, labeled GND, and a control electrode connected to a control signal, CTRL2. The transistor 106 has a first current electrode connected to the first current electrode of the transistor 102, a second current electrode, and a control electrode connected to a control signal, CTRL3. The transistor 108 has a first current electrode connected to the second current electrode of the transistor 106, a second current electrode connected to the second current electrode of the transistor 104, and a control electrode connected to a control signal, CTRL4. The transistor 110 has a first current electrode connected to the first current electrode of the transistor 102, a second current electrode, and a control electrode connected to a control signal, CTRL5. The transistor 112 has a first current electrode connected to the second current electrode of the transistor 110, a second current electrode connected to the second current electrode of the transistor 104, and a control electrode connected to a control signal, CTRL6.

The inductor 114 has a first terminal connected to the second current electrode of the transistor 110, and a second terminal connected to the second current electrode of the transistor 102. The inductor 116 has a first terminal connected to the second current electrode of the transistor 102, and a second terminal. The transformer 118 has a primary and a secondary winding. The primary winding of the transformer 118 has a first terminal connected to the second terminal of the inductor 116, and a second terminal connected to the second current electrode of the transistor 106. The secondary winding of the transformer 118 has first and second terminals coupled to a third voltage reference, and a third terminal coupled to a fourth voltage reference.

The DC-DC converter 100 also includes diodes 120 and 122, inductor 124, and capacitor 126. The diode 120 has a first terminal connected to the first terminal of the secondary winding of the transformer 118, and a second terminal. The diode 122 has a first terminal connected to the second terminal of the secondary winding of the transformer 118, and a second terminal connected to the second terminal of the diode 120. The inductor 124 has a first terminal connected to the second terminal of the diode 122, and a second terminal. The capacitor 126 has a first terminal connected to the second terminal of the inductor 124, and a second terminal connected to the third terminal of the transformer 118.

The transistors 102, 104, 106, and 108 are connected in a full bridge configuration with the inductor 116 and the transformer 118 connected between the outputs of the bridge. The transistors 110 and 112 are connected to the transistors 102 and 104 in a half bridge configuration, and the inductor 114 is connected between the outputs of the half bridge and the full bridge. The transistors 102 and 104 can be disabled and the transistors 110 and 112 can be enabled to form an alternative full bridge configuration between the transistors 106, 108, 110, and 112.

Although there are six total transistors 102, 104, 106, 108, 110, and 112, only four transistors will be active in the circuit at any one point in time. At heavy loads, transistors 102, 104, 106, and 108 are activated to form the full bridge. A DC input voltage, $V_{BULK}$, is applied to the first current electrode of the transistor 102, and the control signal CTRL1 activates the transistor 102 such that the voltage at node $V_B$ is substantially equal to the voltage $V_{BULK}$. At the same time, the control signal CTRL4 activates the transistor 108 such that the voltage at node $V_C$ is substantially equal to zero. At this point, the voltage difference between nodes $V_B$ and $V_C$ causes the inductor 116 to store energy and the transformer 118 to produce a DC output, labeled $V_{OUT}$, across the capacitor 126.

Next, the control signal CTRL4 deactivates transistor 108 and the stored energy in the inductor 116 is used to discharge the parasitic capacitor associated with the transistor 106. Deactivating the transistor 108 prevents $V_C$ from being pulled to ground, because no current can flow through the transistor when it is deactivated. The charging of the parasitic capacitor brings the voltage at node $V_C$ to $V_{BULK}$, and the diode associated with the transistor 106 clamps the voltage such that the voltage at $V_C$ does not exceed $V_{BULK}$. The control signal CTRL3 activates transistor 106. At this point, the activation of the transistor 106 is lossless because there is not a voltage drop across the transistor when it is activated. Because the voltage at node $V_C$ is substantially equal to $V_{BULK}$ it does not require the use of any energy to pull $V_C$ to $V_{BULK}$, and thus the activation of the transistor 106 is lossless.

The control signal CTRL1 deactivates the transistor 102, and the inductor 116 charges the parasitic capacitor associated with the transistor 102 to make the voltage at node $V_B$ substantially equal to zero. Therefore, when the control signal CTRL2 activates the transistor 104 there is not a voltage drop across the transistor because the voltage at node $V_B$ is substantially equal to zero. Thus, the activation of the transistor 104 is also lossless. At this point, the voltage difference between node $V_C$ and node $V_B$ will cause the transformer 118 to produce the DC output voltage across capacitor 126, and the process repeats as stated above. Based on the frequency at which the transistors 102, 104, 106, and 108 are activated and deactivated, the DC-DC converter 100 outputs the DC voltage at a substantially constant voltage that is lower than the voltage $V_{BULK}$.

At light loads, transistors 110, 112, 106, and 108 are activated to form the alternative full bridge. This is made possible by enabling the transistor pair 110 and 112 and disabling the transistor pair 102 and 104. Additionally, the inductor 114 is added to the DC-DC converter 100 at light loads. The DC input voltage, $V_{BULK}$, is applied to the first current electrode of the transistor 110, and the control signal CTRL5 activates the transistor 110 such that the voltage at node $V_A$ is substantially equal to the voltage $V_{BULK}$. At the same time the control signal CTRL4 activates the transistor 108 such that the voltage at node $V_C$ is substantially equal to zero. At this point, the voltage difference between the nodes $V_A$ and $V_C$ causes the inductors 114 and 116 to store energy and the transformer 118 to produce the DC output, $V_{OUT}$, across the capacitor 126.

Next, the control signal CTRL4 deactivates transistor 108 and the stored energy in the inductors 114 and 116 is used to charge the parasitic capacitor associated with the transistor 106. During light loads the energy stored in both of the inductors 114 and 116 is required to charge and discharge the parasitic capacitor associated with the transistors 106, 108, 110, and 112 because only a low amount of current is flowing through the DC-DC converter 100 to store the energy in the inductors. The charging of the parasitic capacitor associated with the transistor 106 brings the voltage at node $V_C$ to $V_{BULK}$, and the diode associated with the transistor 106 clamps the voltage such that the voltage at $V_C$ does not exceed $V_{BULK}$. The control signal CTRL3 activates transistor 106. At this point, the activation of the transistor 106 is lossless because there is not a voltage drop across the transistor.

The control signal CTRL5 deactivates the transistor 110, and the inductors 114 and 116 charge the parasitic capacitor associated with the transistor 110 to make the voltage at node $V_A$ substantially equal to zero. Therefore, when the control signal CTRL6 activates the transistor 112 there is not a voltage drop because the voltage at node $V_A$ is substantially equal to zero. Thus, the activation of the transistor 112 is also lossless. At this point, the voltage difference between the node $V_C$ and node $V_A$ causes the transformer to produce the DC output voltage across capacitor 126, and the process repeats. Based on the frequency at which the transistors 110, 112, 106, and 108 are activated and deactivated, the DC-DC converter 100 outputs the DC voltage at the substantially constant voltage that is lower than the voltage $V_{BULK}$.

Thus, the DC-DC converter 100 can achieve zero voltage switching at both heavy and light loads. Also, the addition of the inductor 114, at light loads, provides more energy to the DC-DC converter 100. Therefore, the inductors 114 and 116 can charge and discharge the parasitic capacitors associated with the transistors 106, 108, 110, and 112 in the specified time to allow the activation of the transistors to be lossless at light loads. Additionally, the inductor 116 can provide enough energy to charge and discharge the transistors 102, 104, 106, and 108 in the specified time at heavy loads. Thus, the activation of the transistors 102, 104, 106, and 108 is lossless at heavy loads. Based on the frequency of the quasi-resonant switching of the transistors 106, 108, 110, and 112 at light loads and the frequency of the quasi-resonant switching of the transistors 102, 104, 106, and 108 at heavy loads, the DC-DC converter 100 can provide a substantially constant DC output voltage that is scaled down from $V_{BULK}$.

Figure 2:
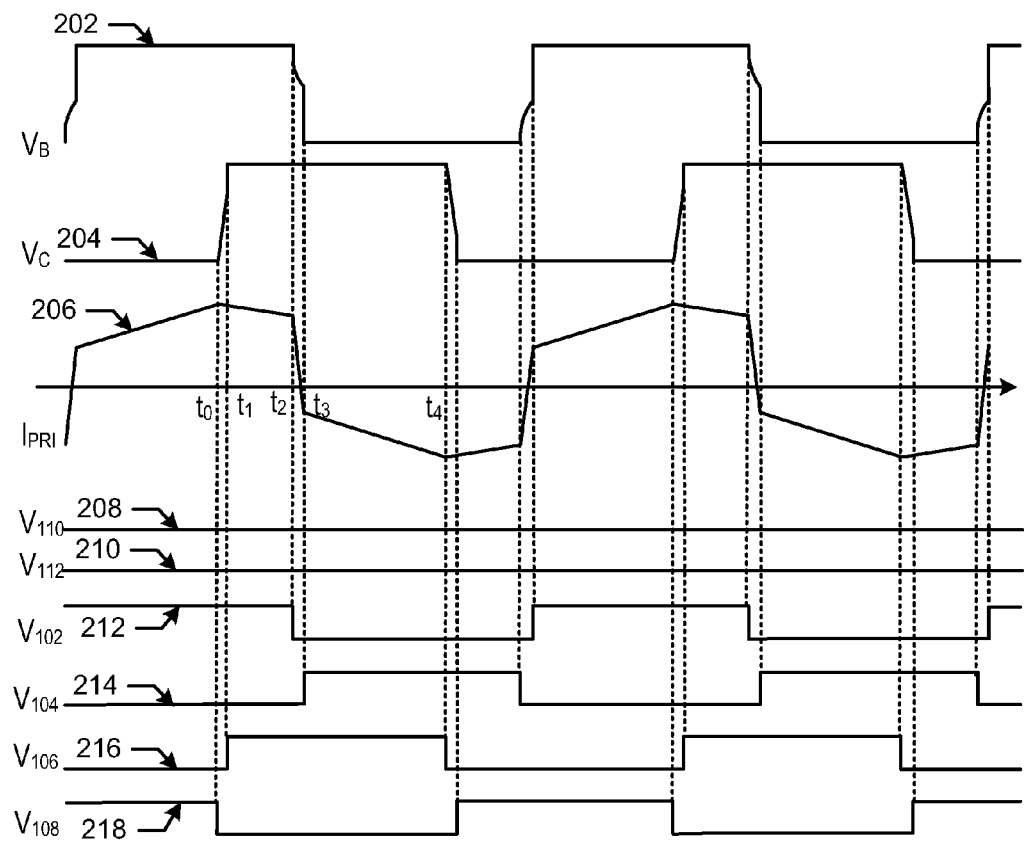
FIG. 2 is a graph of a plurality of waveforms associated with the DC-DC converter circuit of FIG. 1.

FIG. 2 shows a plurality of waveforms 202, 204, 206, 208, 210, 212, 214, 216, and 218 associated with the DC-DC converter 100 of FIG. 1 at light loads. Transistors 110 and 112 (represented by waveforms 208 and 210 respectively) are continuously OFF. The initial condition of the DC-DC converter 100 in this configuration is prior to $t_0$ where transistors 102 and 108 (represented by waveforms 212 and 218 respectively) are ON and transistors 104 and 106 (represented by waveforms 214 and 216 respectively) are OFF. At $t_0$, transistor 108 is turned OFF and the current in the inductor 116 continues to flow (represented by waveform 206), charging the parasitic capacitor associated with the transistor 108 and discharging the parasitic capacitor associated with the transistor 106, driving the $V_C$ voltage level up (represented by waveform 204). At $t_1$, transistor 106 is turned ON. However, the activation is not lossless, because the voltage across this device is not zero ($V_C$ did not reach $V_{BULK}$ prior to $t_1$). Going forward, $t_2$ is the time when transistor 102 turns OFF and the current flowing through the inductor 116 starts charging the parasitic capacitor associated with the transistor 102 and discharging the parasitic capacitor associated with the transistor 104. Consequently, $V_B$ starts dropping (represented by waveform 202), but because the inductor 116 does not have enough energy, $V_B$ cannot reach zero volts by the time $t_3$, when transistor 104 turns ON. Consequently, the activation of transistor 104 is also not lossless.

Figure 3:
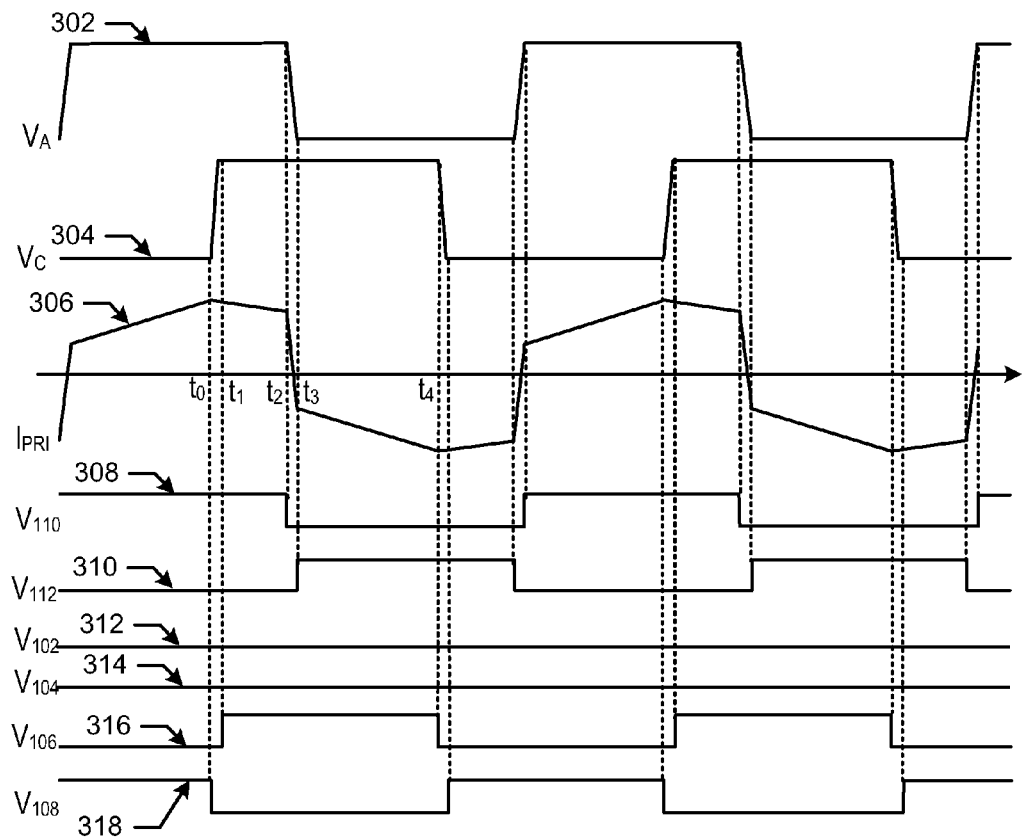
FIG. 3 is a graph of an alternative plurality of waveforms associated with the DC-DC converter circuit of FIG. 1.

FIG. 3 shows an alternative plurality of waveforms 302, 304, 306, 308, 310, 312, 314, 316, and 318 associated with the DC-DC converter 100 of FIG. 1 at light loads. Transistors 102 and 104 (represented by waveforms 312 and 314 respectively) are continuously OFF. The initial condition of the DC-DC converter 100 in this configuration is prior to $t_0$ where transistors 110 and 108 (represented by waveforms 308 and 318 respectively) are ON and transistors 112 and 106 (represented by waveforms 310 and 316 respectively) are OFF. At $t_0$, transistor 108 is turned OFF and the current flowing through the combined inductors 114 and 116 (represented by waveform 306) charges the parasitic capacitor associated with transistor 108 and discharges the parasitic capacitor associated with the transistor 106, quickly driving $V_C$ (represented by waveform 304) to the $V_{BULK}$ level. The transistor 106 body diode clamps voltage $V_C$, preventing it from exceeding $V_{BULK}$. At $t_1$, the transistor 106 is turned ON, in a lossless activation, because there are zero volts across this transistor. Going forward, $t_2$ is the time when the transistor 110 turns OFF and the current flowing through the inductors 114 and 116 starts charging the parasitic capacitor associated with the transistor 110 and discharging the parasitic capacitor associated with the transistor 112. Consequently, $V_A$ (represented by waveform 302) starts dropping and reaches zero volts before $t_3$. The transistor 112 body diode clamps voltage $V_A$, preventing it from dropping below zero volts. At $t_3$, the transistor 112 turns ON in a lossless activation (zero volts across), and $t_4$ marks the beginning of the next switching cycle.

Figure 4:
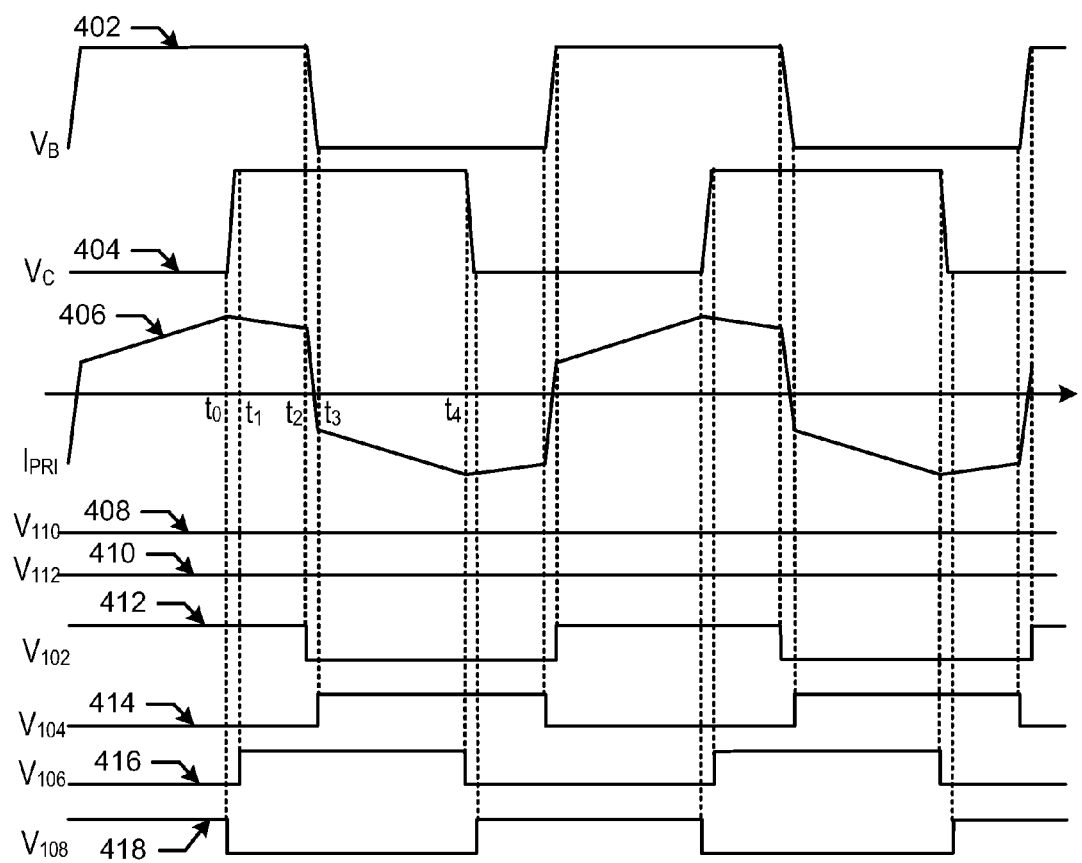
FIG. 4 is a graph of an additional alternative plurality of waveforms associated with the DC-DC converter circuit of FIG. 1.

FIG. 4 shows an alternative plurality of waveforms 402, 404, 406, 408, 410, 412, 414, 416, and 418 associated with the DC-DC converter 100 of FIG. 1 at heavy loads. Transistors 110 and 112 (represented by waveforms 408 and 410 respectively) are continuously OFF. The initial condition of the DC-DC converter 100 in this configuration is prior to $t_0$ where transistors 102 and 108 (represented by waveforms 412 and 418 respectively) are ON and transistors 104 and 106 (represented by waveforms 414 and 416 respectively) are OFF. At $t_0$, transistor 108 is turned OFF and the current in the inductor 116 continues to flow (represented by waveform 406), charging the parasitic capacitor associated with the transistor 108 and discharging the parasitic capacitor associated with the transistor 106, driving the voltage $V_C$ level up (represented by waveform 404) to the $V_{BULK}$ level. The heavy load provides the inductor 116 with enough energy to drive $V_C$ to $V_{BULK}$ before $t_1$. The transistor 106 body diode clamps voltage $V_C$, preventing it from exceeding $V_{BULK}$. At $t_1$, the transistor 106 is turned ON, in a lossless activation, because there are zero volts across this transistor. Going forward, $t_2$ is the time when transistor 102 turns OFF and the current flowing through the inductor 116 starts charging the parasitic capacitor associated with the transistor 102 and discharging the parasitic capacitor associated with the transistor 104. Consequently, $V_B$ (represented by waveform 402) starts dropping and reaches zero volts before $t_3$ because the heavy load produces enough energy in the inductor 116. The transistor 104 body diode clamps voltage $V_A$, preventing it from dropping below zero volts. At $t_3$, the transistor 104 turns ON in a lossless activation (zero volts across), and $t_4$ marks the beginning of the next switching cycle.

Figure 5:
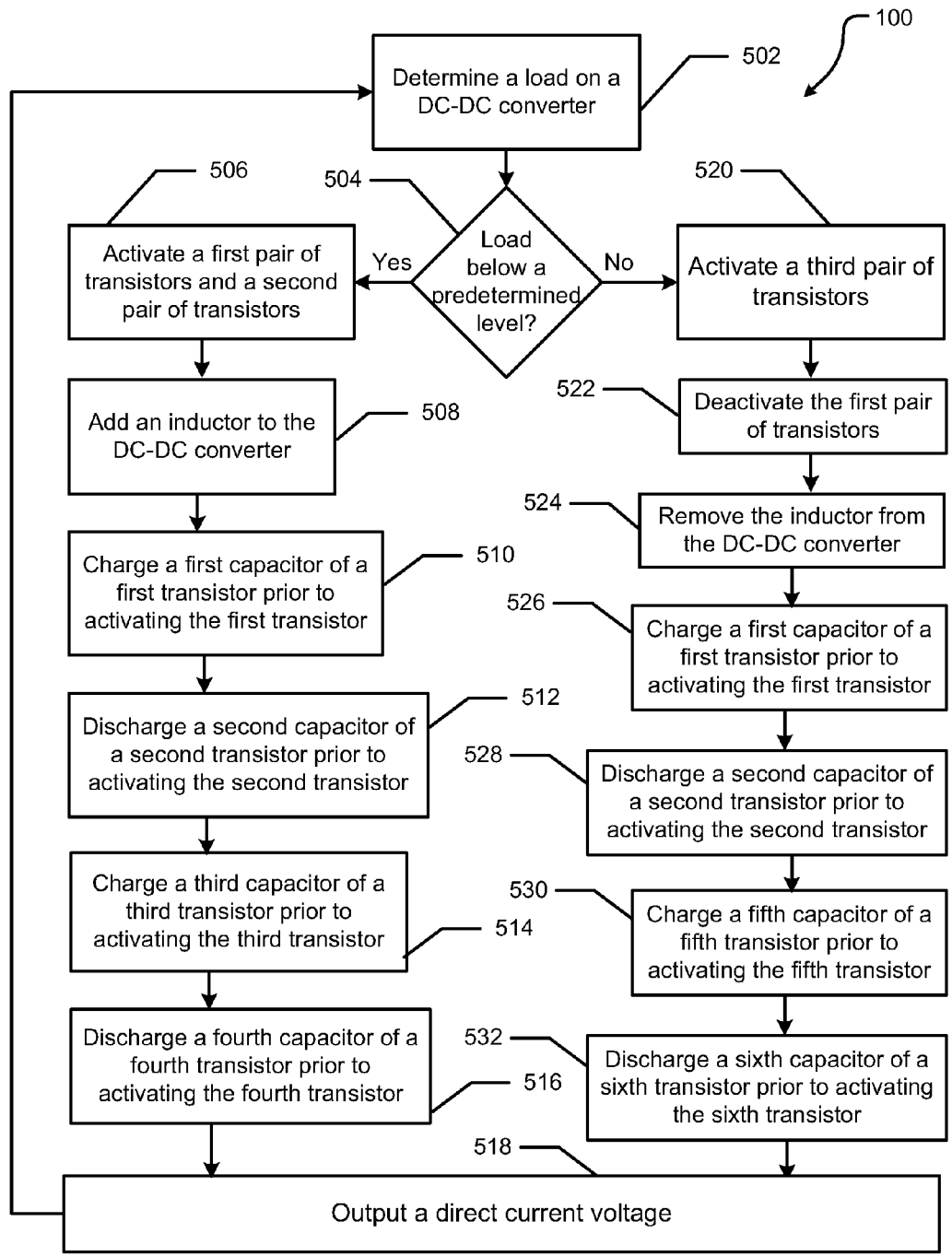
FIG. 5 is a block diagram of a method for achieving zero voltage switching in the DC-DC converter circuit of FIG. 1.

FIG. 5 is a block diagram of a method 500 for achieving zero voltage switching in the DC-DC converter circuit of FIG. 1. At block 502 a load applied to the DC-DC converter is determined. A determination is made whether the load is below a predetermined level at block 504. At block 506, if the load is below the predetermined level, a first pair of transistors and a second pair of transistors are activated. An inductor is added to the DC-DC converter at block 508. At block 510, a first capacitor associated with a first transistor of the second transistor pair is charged prior to activating the first transistor. A second capacitor associated with a second transistor of the second transistor pair is discharged prior to activating the second transistor at block 512. At block 514, a third capacitor associated with a third transistor of the first transistor pair is charged prior to activating the third transistor. A fourth capacitor associated with a fourth transistor of the first transistor pair is discharged prior to activating the fourth transistor at block 516. At block 518, a direct current voltage is outputted and the method continues as stated above at block 502.

If the load is not below the predetermined level, a third pair of transistors and the second pair of transistors is activated at block 520. At block 522, the first pair of transistors is deactivated. The inductor is removed from the DC-DC converter at block 524. At block 526, the first capacitor associated with the first transistor of the second transistor pair is charged prior to activating the first transistor. The second capacitor associated with the second transistor of the second transistor pair is discharged prior to activating the second transistor at block 528. At block 530, a fifth capacitor associated with a fifth transistor of the third transistor pair is charged prior to activating the fifth transistor. A sixth capacitor associated with a sixth transistor of the third transistor pair is discharged prior to activating the sixth transistor at block 532. At block 518, the direct current voltage is outputted and the method continues as stated above at block 502.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device comprising:
a full bridge having a first terminal, a second terminal, a third terminal, and a fourth terminal, and first and second pairs of transistors, the first pair of transistors being activated and deactivated when a load applied to the device is above a predetermined level and continuously deactivated when the load applied to the device is below the predetermined level, the second pair of transistors being activated and deactivated when the load applied to the device is both above and below the predetermined level;
a half bridge having a first terminal connected to the first terminal of the full bridge, a second terminal connected to the second terminal of the full bridge, a third terminal coupled to the third terminal of the full bridge, and a third pair of transistors activated and deactivated when the load applied to the device is below the predetermined level and continuously deactivated when the load applied to the device is above the predetermined level;
a first inductor having a first terminal connected to the third terminal of the full bridge, and a second terminal coupled to the fourth terminal of the full bridge, the first inductor adapted to provide a zero voltage switching of the device at a heavy load; and
a second inductor having a first terminal connected to the third terminal of the half bridge, and a second terminal coupled to the first terminal of the first inductor, the second inductor adapted to cooperate with the first inductor to provide the zero voltage switching of the device at a light load;
wherein the first and third pairs of transistors are activated at different times.

2. The device of claim 1 wherein the third pair of transistors of the half bridge and the second pair of transistor of the full bridge form an alternate full bridge at light loads.

3. The device of claim 1 further comprising:
a transformer adapted to provide a substantially constant direct current output voltage based on a switching of the full bridge and the half bridge transistors, the transformer including:
a primary winding having a first terminal connected to the second terminal of the first inductor and a second terminal connected to the fourth terminal of the full bridge; and
a secondary winding having first and second terminals coupled to a third voltage reference, and a third terminal connected to a fourth voltage reference.

4. The device of claim 1 wherein the first pair of transistors includes:
a first transistor including a first current electrode connected to the first voltage reference, a second current electrode connected to the first terminal of the first inductor, and a control electrode connected to a first control signal; and
a second transistor including a first current electrode connected to the second current electrode of the first transistor, a second current electrode connected to the second voltage reference, and a control electrode connected to a second control signal.

5. The device of claim 4 wherein the second pair of transistors includes:
a third transistor including a first current electrode connected to the first voltage reference, a second current electrode coupled to the second terminal of the first inductor, and a control electrode connected to a third control signal; and
a fourth transistor including a first current electrode connected to the second current electrode of the third transistor, a second current electrode connected to the second voltage reference, and a control electrode connected to a fourth control signal.

6. The device of claim 5 wherein the third pair of transistors includes:
a fifth transistor including a first current electrode connected to the first voltage reference, a second current electrode connected to the first terminal of the second inductor, and a control electrode connected to a fifth control signal; and
a sixth transistor including a first current electrode connected to the second current electrode of the fifth transistor, a second current electrode connected to the second voltage reference, and a control electrode connected to a sixth control signal.

7. The device of claim 6 wherein the first, second, third, fourth, fifth, and sixth transistors are adapted to activate and deactivate at different times to provide a zero voltage switching.

8. A device comprising:
a first transistor including a first current electrode connected to a first voltage reference, a second current electrode, and a control electrode connected to a first control signal, the first transistor adapted to activate and deactivate during a heavy load, and configured to be continuously deactivated during a light load;
a second transistor including a first current electrode connected to the second current electrode of the first transistor, a second current electrode connected to a second voltage reference, and a control electrode connected to a second control signal, the second transistor adapted to activate and deactivate during the heavy load, and configured to be continuously deactivated during the light load;
a third transistor including a first current electrode connected to the first voltage reference, a second current electrode coupled to the second current electrode of the first transistor, and a control electrode connected to a third control signal, the third transistor adapted to activate and deactivate during the heavy load and the light load;
a fourth transistor including a first current electrode connected to the second current electrode of the third transistor, a second current electrode connected to the second voltage reference, and a control electrode connected to a fourth control signal, the fourth transistor adapted to activate and deactivate during the heavy load and the light load;
a fifth transistor including a first current electrode connected to the first voltage reference, a second current electrode coupled to the second current electrode of the first transistor, and a control electrode connected to a fifth control signal, the fifth transistor adapted to activate and deactivate during the light load, and configured to be continuously deactivated during the heavy load;
a sixth transistor including a first current electrode connected to the second current electrode of the fifth transistor, a second current electrode connected to the second voltage reference, and a control electrode connected to a sixth control signal, the sixth transistor adapted to activate and deactivate during the light load, and configured to be continuously deactivated during the heavy load;
a first inductor having a first terminal connected to the second current electrode of the first transistor, and a second terminal coupled to the second current electrode of the third transistor, the first inductor adapted to provide a zero voltage switching of the device at the heavy load; and a second inductor having a first terminal connected to the second current electrode of the fifth transistor, and a second terminal connected to the second terminal of the first transistor, the second inductor adapted to cooperate with the first inductor to provide the zero voltage switching of the device at the light load, wherein an efficiency of the device is increased based on an introduction of the second inductor during the light load;

wherein the first and second transistors are activated at different times than the fifth and sixth transistors.

9. The device of claim 8 further comprising:

a transformer adapted to provide a substantially constant direct current output voltage based on a switching of the first, second, third, fourth, fifth, and sixth transistors, the transformer including:
- a primary winding having a first terminal connected to the second terminal of the first inductor and a second terminal connected to the second current electrode of the third transistor; and
- a secondary winding having first and second terminals coupled to a third voltage reference, and a third terminal connected to a fourth voltage reference.

10. The device of claim 8 wherein the device is adapted to prevent a switching loss during a direct current to direct current voltage conversion.

11. The device of claim 8 wherein the first inductor and the second inductor are further adapted to combine at the light load to charge and discharge a plurality of parasitic capacitors associated with the third, fourth, fifth, and sixth transistors in a specified amount of time.

12. A method comprising:

determining a load amount being applied to a direct current to direct current converter;

activating first and second pairs of transistors of a full bridge in the direct current to direct current converter if the load amount is below a predetermined level;

introducing an inductor into the direct current to direct current converter by enabling the second pair of transistors and disabling the first pair of transistors, wherein an efficiency of the direct current to direct current converter is increased based on the introduction of the inductor when the load amount is below the predetermined level;

charging a first capacitor of a first transistor of the second pair of transistors prior to activating the first transistor;

discharging a second capacitor of a second transistor of the second pair of transistors prior to activating the second transistor; and outputting a direct current voltage.

13. The method of claim 12 wherein a zero voltage switching is maintained when the load amount is below the predetermined level by introducing the inductor into the direct current to direct current converter.

14. The method of claim 12 further comprising:

charging a third capacitor of a third transistor of the first pair of transistors prior to activating the third transistor; and discharging a fourth capacitor of a fourth transistor of the first pair of transistors prior to activating the fourth transistor.

15. The method of claim 14 further comprising:

deactivating the first pair of transistors if the load amount is above the predetermined level;

activating a third pair of transistors if the load amount is above the predetermined level; and removing the inductor from the direct current to direct current converter based on deactivating the first pair of transistors and activating the third pair of transistors.

16. The method of claim 15 wherein a zero voltage switching is maintained when the load amount is below the predetermined level by introducing the inductor into the direct current to direct current converter.

17. The method of claim 15 wherein an efficiency of the direct current to direct current converter is increased based on the introduction of the inductor when the load amount in below the predetermined level.

18. The method of claim 15 further comprising:

charging a fifth capacitor of a fifth transistor of the third pair of transistors prior to activating the fifth transistor; and discharging a sixth capacitor of a sixth transistor of the third pair of transistors prior to activating the sixth transistor.

19. The method of claim 18 wherein the third and fourth transistors and the fifth and sixth transistors are activated at different points in time.

* * * * *